United States Patent
Wurzburg

(10) Patent No.: US 7,131,595 B2
(45) Date of Patent: Nov. 7, 2006

(54) AUTOMATIC DRIVE ICON ASSIGNMENT BY MEDIA TYPE IN SINGLE SLOT USB CARD READERS

(75) Inventor: Henry Wurzburg, Austin, TX (US)

(73) Assignee: Standard Microsystems Corporation, Hauppauge, NY (US)

( * ) Notice: Subject to any disclaimer, the term of this patent is extended or adjusted under 35 U.S.C. 154(b) by 194 days.

(21) Appl. No.: 10/762,679

(22) Filed: Jan. 20, 2004

(65) Prior Publication Data
US 2005/0156037 A1    Jul. 21, 2005

(51) Int. Cl.
G06K 19/06      (2006.01)
(52) U.S. Cl. ................... 235/492; 235/451; 235/375
(58) Field of Classification Search ............... 235/375, 235/382, 380, 382.5, 492; 710/301–303
See application file for complete search history.

(56) References Cited

U.S. PATENT DOCUMENTS

| | | | |
|---|---|---|---|
| 4,390,964 A * | 6/1983 | Horky et al. ................. 710/74 |
| 5,541,985 A | 7/1996 | Ishii et al. |
| 5,630,081 A | 5/1997 | Rybicki et al. |
| 5,786,769 A * | 7/1998 | Coteus et al. ............... 340/687 |
| 5,793,359 A | 8/1998 | Ushikubo |
| 5,815,426 A * | 9/1998 | Jigour et al. ................. 365/51 |
| 5,841,654 A * | 11/1998 | Verissimo et al. ............ 700/83 |
| 5,877,483 A * | 3/1999 | Bilich et al. ................ 235/382 |
| 5,953,511 A | 9/1999 | Sescila, III et al. |
| 5,987,134 A * | 11/1999 | Shin et al. .................. 713/159 |
| 6,000,607 A * | 12/1999 | Ohki et al. .................. 235/379 |
| 6,168,077 B1 * | 1/2001 | Gray et al. .................. 235/375 |
| 6,230,277 B1 | 5/2001 | Nakaoka et al. |
| 6,279,060 B1 | 8/2001 | Luke et al. |
| 6,317,839 B1 | 11/2001 | Wells |
| 6,349,878 B1 * | 2/2002 | Imai .......................... 235/440 |
| 6,389,544 B1 | 5/2002 | Katagiri |
| 6,405,362 B1 | 6/2002 | Shih et al. |
| 6,435,904 B1 | 8/2002 | Herbst et al. |
| 6,438,638 B1 * | 8/2002 | Jones et al. ................. 710/301 |
| 6,460,143 B1 | 10/2002 | Howard et al. |

(Continued)

FOREIGN PATENT DOCUMENTS

JP        07334633 A    *  12/1995

(Continued)

OTHER PUBLICATIONS

U.S. Appl. No. 10/762,684, filed Jan. 20, 2004, Wurzburg.

(Continued)

Primary Examiner—Kimberly D. Nguyen
(74) Attorney, Agent, or Firm—Meyertons Hood Kivlin Kowert & Goetzel, P.C.; Jeffrey C. Hood; Russell E. Henrichs

(57) ABSTRACT

In various embodiments, icons, specific to a type of memory card (e.g., a flash memory card) inserted into a card reader may be displayed. In some embodiments, the card reader may be electrically connected to the host controller each time a memory card is inserted into the card reader. In various embodiments, different device identifications may be reported as if the card reader were actually several different card readers each dedicated to a different memory card type. A registry of an operating system may be pre-loaded with a different icon for each of the different card reader types. An icon may be displayed on a display specific to the type of memory card inserted. When the memory card is removed, the card reader may be electrically disconnected and the displayed icon may be removed or replaced.

26 Claims, 7 Drawing Sheets

U.S. PATENT DOCUMENTS

| | | |
|---|---|---|
| 6,467,042 B1 | 10/2002 | Wright et al. |
| 6,505,267 B1 | 1/2003 | Luke et al. |
| 6,510,524 B1 | 1/2003 | Osburn et al. |
| 6,519,669 B1 | 2/2003 | Yanagisawa |
| 6,557,754 B1 * | 5/2003 | Gray et al. ............... 235/375 |
| 6,598,100 B1 * | 7/2003 | Shu et al. .................. 710/62 |
| 6,601,180 B1 | 7/2003 | Paredes et al. |
| 6,654,841 B1 | 11/2003 | Lin |
| 6,714,215 B1 | 3/2004 | Flora et al. |
| 6,910,627 B1 * | 6/2005 | Simpson-Young et al. .. 235/381 |
| 6,928,562 B1 | 8/2005 | Cohen et al. |
| 2002/0155893 A1 * | 10/2002 | Swanberg et al. ............ 463/43 |
| 2003/0058284 A1 * | 3/2003 | Toh et al. ................... 345/810 |
| 2003/0167345 A1 | 9/2003 | Knight et al. |
| 2004/0027879 A1 | 2/2004 | Chang |
| 2004/0163003 A1 | 8/2004 | Dutton et al. |
| 2005/0156038 A1 | 7/2005 | Wurzburg et al. |

FOREIGN PATENT DOCUMENTS

| | | |
|---|---|---|
| JP | 08050643 A | 2/1996 |

OTHER PUBLICATIONS

"The Laptop Computer May Be Unable to Enter the C3 Processor Power-Saving State", originally downloaded from: http://support.microsoft.com/default.aspx?scid=kbjen-us;297045 (Article publication date is unknown).

* cited by examiner

AUTOMATIC DRIVE ICON ASSIGNMENT BY MEDIA TYPE IN SINGLE SLOT USB CARD READERS

BACKGROUND OF THE INVENTION

1. Field of the Invention

This invention relates generally to computer systems and, more particularly, to card readers.

2. Description of the Related Art

In recent years the electronics marketplace has seen a proliferation of appliances and personal electronics devices that use solid-state memory. For example, traditional film cameras have been losing market share to digital cameras capable of recording images that may be directly downloaded to and stored on personal computers (PCs). The pictures recorded by digital cameras can easily be converted to common graphics file formats such as Joint Photographic Experts Group (JPEG), Graphic Interchange Format (GIF) or Bitmap (BMP), and sent as e-mail attachments or posted on web pages and online photo albums. Many digital cameras are also capable of capturing short video clips in standard digital video formats, for example Moving Picture Experts Group (MPEG), which may also be directly downloaded and stored on personal computers (PCs) or notebook computers. Other devices that typically use solid-state memory include personal digital assistants (PDAs), pocket PCs, video game consoles and Moving Picture Experts Group Layer-3 Audio (MP3) players.

The most widely used solid-state memory devices include flash-memory chips configured on a small removable memory card, and are commonly referred to as flash-memory cards. The majority of flash-memory cards currently on the market are typically one of: Compact Flash™, MultiMediaMemory™ memory card (MMC) and the related Secure Digital Memory card (SD), SmartMedia™ memory card (SM), xD Picture Cards™ (xD), and Memory Stick™. Most digital cameras, for example, use Compact Flash™ memory cards to record images. Many PDA models use Memory Stick™ memory cards to hold data. Some MP3 players store music files on SM memory cards. Generally, data saved by PDAs and other handheld devices using flash-memory cards are also transferred or downloaded to a PC. In the present application, the term "flash-memory" is intended to have the full breadth of its ordinary meaning, which generally encompasses various types of non-volatile solid-state memory devices.

Typically, a flash-memory card can easily be removed from the utilizing device. For example, a Compact Flash™ memory card can be removed from a digital camera much like film is removed from a standard camera. The flash-memory card can then be inserted into an appropriate flash-memory card reader hooked up to a PC, and the image files directly copied to the PC. It should be noted that while a majority of smaller hand-held computers and PDAs have slots that receive Compact Flash™ memory cards, most PCs do not, hence the need for a flash-memory card reader connecting to the PC. Most recently the preferred interface between flash-memory card readers and PCs has been the Universal Serial Bus (USB), where the flash-memory card reader is connected to a USB port on the PC via a USB cable. Portable computer or notebook PCs typically also have PC-memory card (earlier known as Personal Computer Memory card International Association; PCMCIA) slots that can receive PCMCIA memory cards configured as flash-memory card readers.

In all, the many different memory card formats present a wide array of interface requirements not only for PCs but for other digital systems as well, such as embedded systems. Different adapters are needed for each of the memory card formats. One solution to consolidate the interfacing of flash-memory cards to desktop and portable computer PCs has been the design and manufacture of multi-format flash-memory card readers that are capable of reading the most popular formats. Such memory card-readers are sometimes referred to as 'Seven-in-one' readers indicating that they may be used with the currently popular flash-memory card formats. As indicated above, such multi-format card readers are typically designed with a USB interface. USB based systems require that a USB host controller be present in the host system, and that the operating system (OS) of the host system support USB and USB Mass Storage Class Devices. In addition, screen icons and text for these card readers do not indicate what type of card is currently in the card reader.

SUMMARY OF THE INVENTION

In various embodiments, a system may display an icon, specific to a type of memory card inserted into a card reader. Data may be read from a memory card in a memory card slot for use by a central processing unit (CPU). Card readers, for example, multi-format flash-memory card readers, may be used to read data from various types of memory cards.

In some embodiments, a memory card may be inserted into a card reader. In response, the card reader may be electrically connected to the host controller. In some embodiments, a device identification, such as, but not limited to, a USB Product ID, may be reported to the host controller for the card reader. The device identification may be specific to the type of memory card inserted into the card reader. For example, different device identifications may be reported as if the card reader were actually several different card readers each dedicated to a different memory card type. In some embodiments, a registry of an operating system may be preloaded with a different icon for each of the different card reader types. When the device identification is reported, an icon matching the specific type of memory card may be determined. In some embodiments, an icon may be displayed on a screen. Text may also be displayed proximate to the icon to further identify the type of memory card inserted. As used herein, "proximate" may refer to displaying text sufficiently close to the icon such that a user understands the correspondence between the two.

In some embodiments, when a memory card is removed from a card reader, the card reader may be electrically disconnected from the host controller. When the card reader is electrically disconnected from the host controller, the icon may be removed from the display. In some embodiments, an empty card reader icon may be displayed in place of the icon to indicate the card reader is empty. The text next to the icon may also be changed or removed to reflect the new status.

BRIEF DESCRIPTION OF THE DRAWINGS

The foregoing, as well as other objects, features, and advantages of this invention may be more completely understood by reference to the following detailed description when read together with the accompanying drawings in which.

Figure 1:
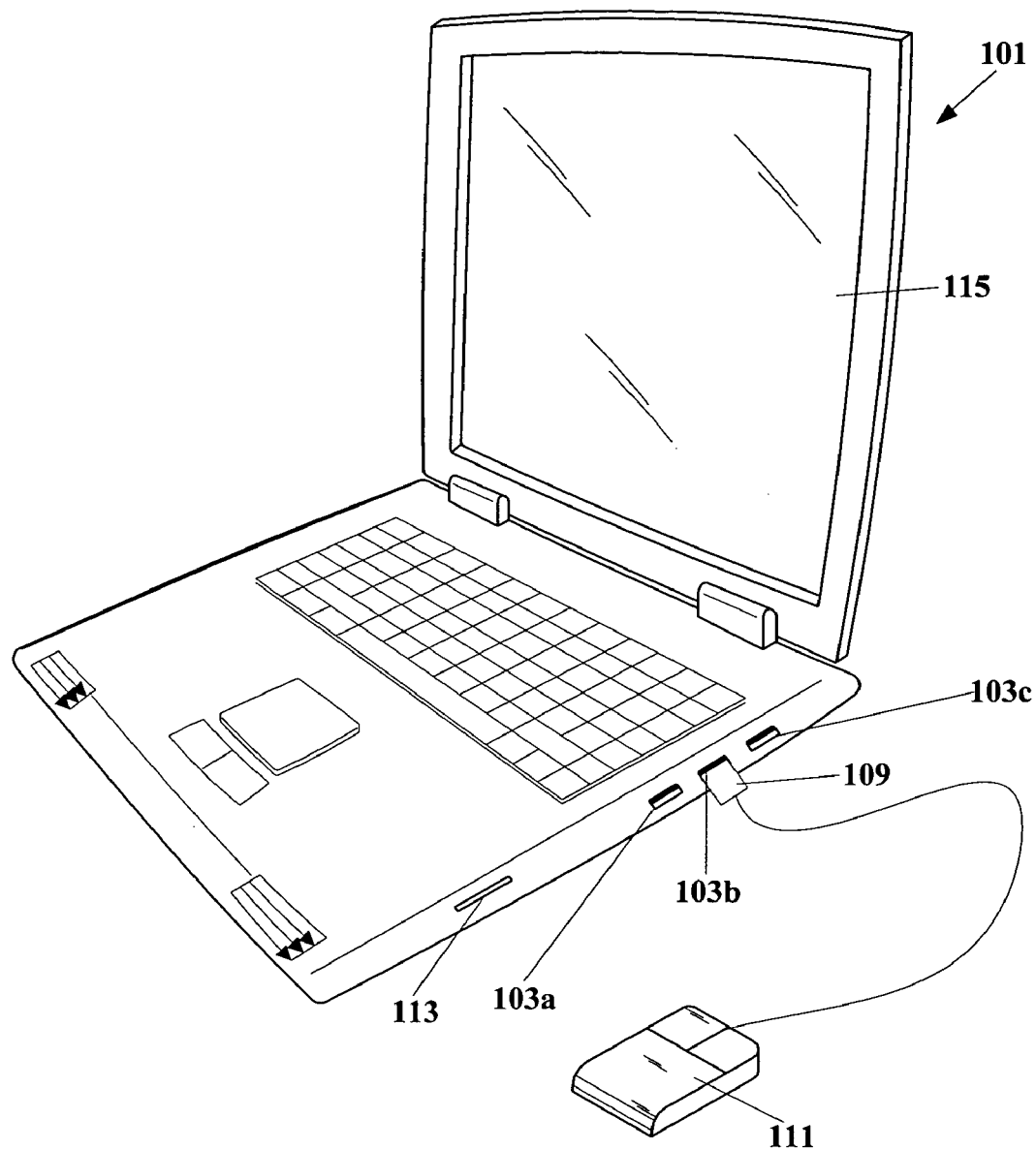
FIG. 1 illustrates a portable computer for various embodiments.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)." The term "include", and derivations thereof, mean "including, but not limited to". The term "coupled" means "directly or indirectly connected".

DETAILED DESCRIPTION OF THE PREFERRED EMBODIMENTS

FIG. 1 illustrates a portable computer, e.g., a laptop, which may implement various embodiments of the invention. Embodiments of the invention may be used with various different types of systems of computers, and portable computer 101 is one exemplary embodiment.

In some embodiments, card readers 113 may be used to read data from various types of memory cards (e.g., flash memory cards). It is to be understood that the term "card reader" as used herein applies to any removable storage medium device and the term "card" as used herein refers to applicable storage media. The card reader 113 may be internal to the computer 101 or may be an external device coupled to the computer 101 through an available port. For example, the card reader may be coupled to the portable computer 101 through one or more Universal Serial Bus (USB) ports 103. The USB ports may be on the portable computer 101 or on a docking station (not shown) coupled to the portable computer 101. A USB connector 109 may plug into a USB port 103 to couple a device (e.g., a mouse 111 or an external card reader) to the portable computer 101.

In some embodiments, the portable computer 101 may be used with other peripheral devices such as, but not limited to, a computer mouse 111, scanners, printers, external memory devices, cameras, personal digital assistants (PDAs), keyboards, touchscreens, and joysticks. Other peripheral devices are also contemplated. In addition, a hub (not shown) may be coupled to a USB port 103 of the portable computer 101 to provide additional USB ports for additional peripheral devices. Icons resembling different devices coupled to the computer may be shown on the display 115 for user access.

In some embodiments, a host controller may regulate communication with connected USB devices such as a card reader. For example, the host controller may schedule bandwidth on the serial bus. Communication speeds with the USB devices coupled to the host controller may include low speed (LS), full speed (FS), and high speed (HS). In some embodiments, the host controller may detect a card reader or other USB device as it is connected to a USB port, interrogate the USB device (e.g., to find out what speed to use for communication with the device and device capabilities), and load a driver to support the USB device. USB devices may communicate with the host controller using control, interrupt, bulk, and isochronous transfers. While the USB device may be powered over the USB bus, some USB devices may be self powered. When a USB device is unplugged from a USB port 103, the host controller may detect the absence of the USB device and unload the driver. In some embodiments, a USB device may be connected or unconnected from a USB port 103 without restarting the computer.

Figure 2:
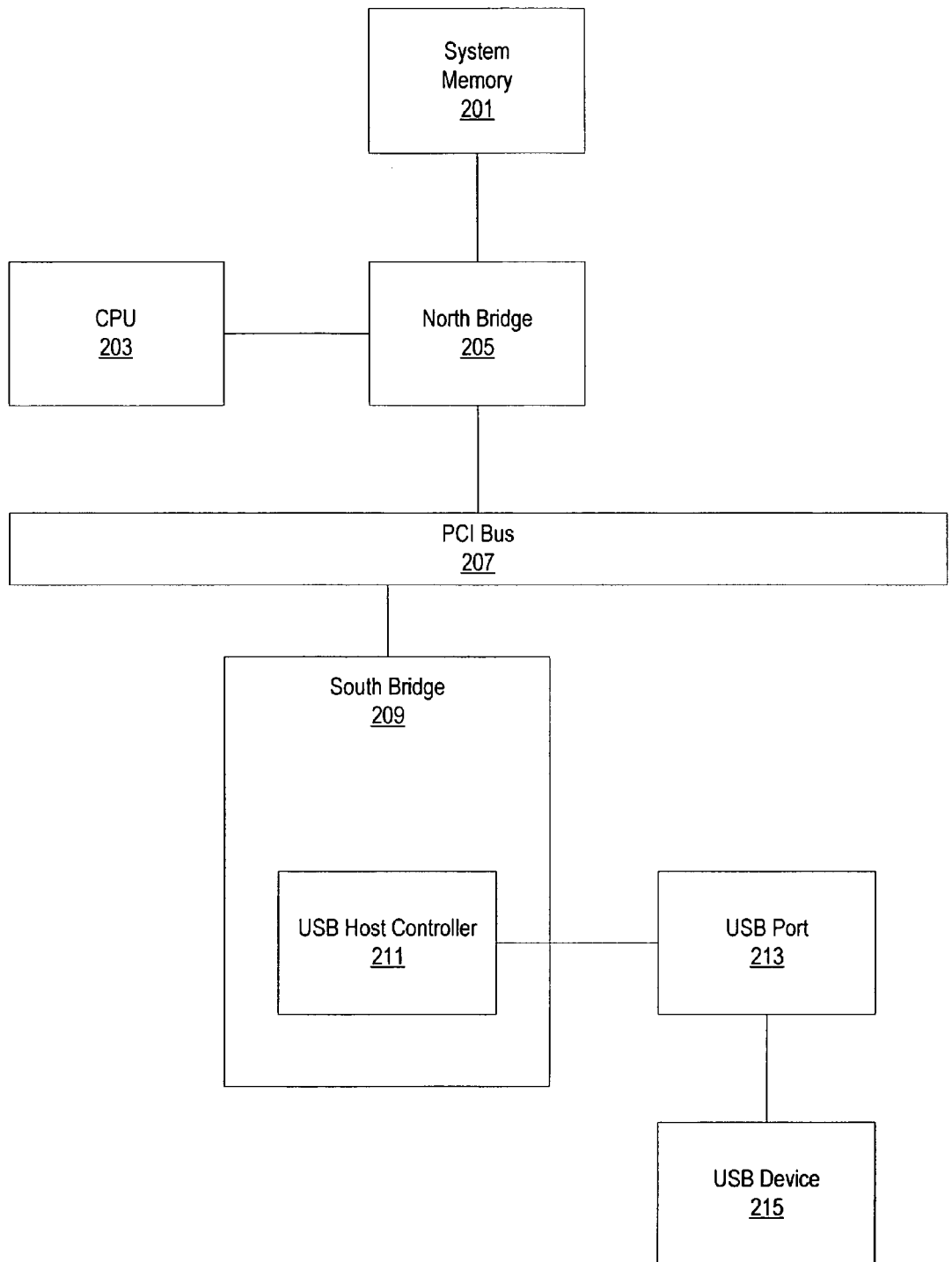
FIG. 2 is a block diagram of a computer, according to one embodiment.

FIG. 2 is a block diagram of one embodiment of a computer 101. In some embodiments, north bridge 205 (an integrated chip) couples a central processing unit (CPU) 203 and system memory 201 to a peripheral component interconnect (PCI) bus 207 (used to connect peripherals to the computer). South bridge 209 may couple the PCI bus 207. In some embodiments, the south bridge 209 may include a USB host controller 211 to communicate through a USB port 213 with a USB device 215. The USB port 213 and USB device 215 may be internal or external to the computer. In some embodiments, the USB host controller 211 may provide a peripheral bus interface between the USB device 215 and the computer.

Figure 3:
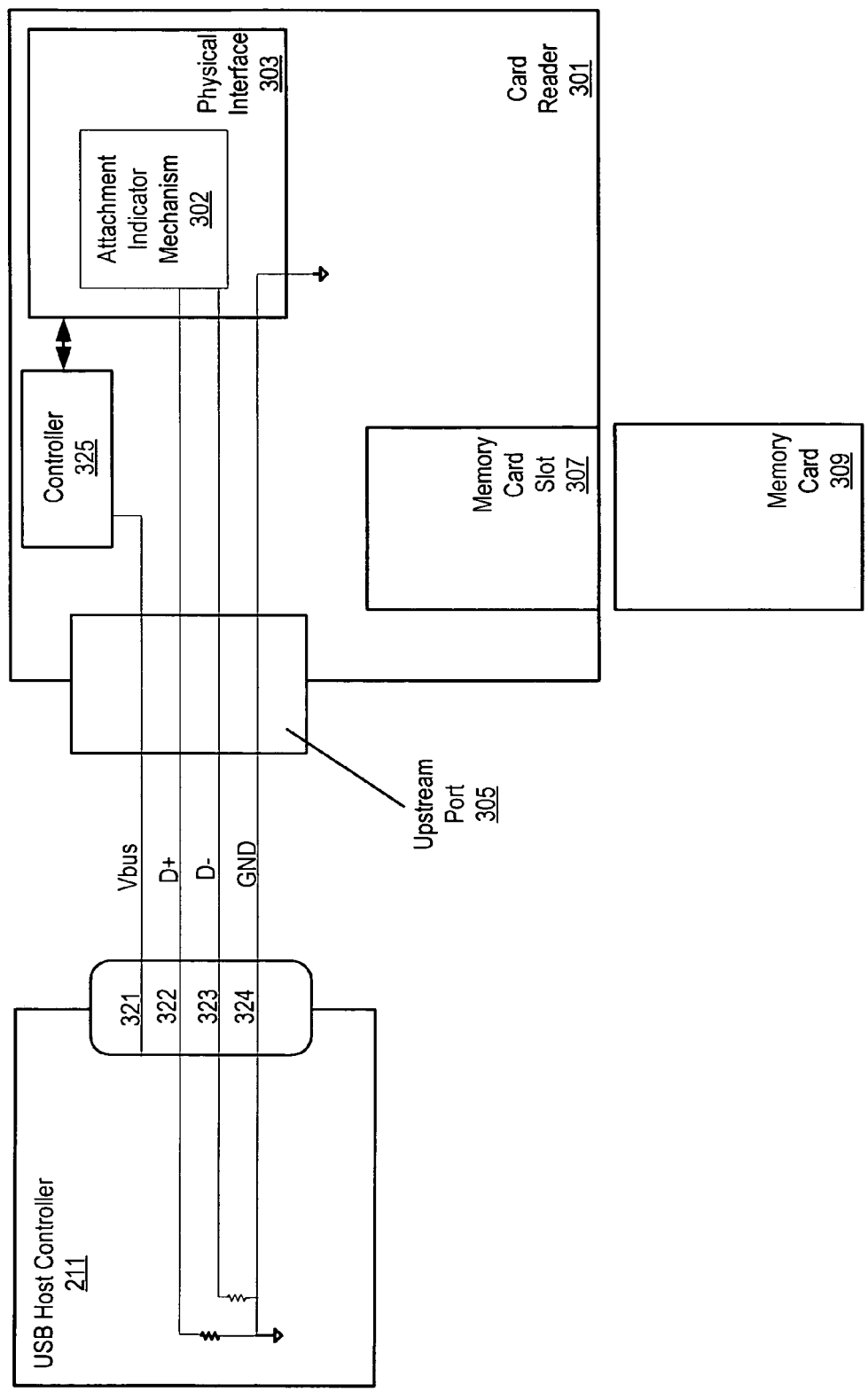
FIG. 3 illustrates a diagram of a card reader coupled to a host controller, according to an embodiment.

FIG. 3 illustrates an embodiment of a card reader 301 coupled to host controller 211. In some embodiments, the card reader 301 may communicate with host controller 211 through an upstream port 305. The card reader 301 may use a controller 325 and a physical interface 303 to assist in reading, writing, and transferring data to the memory card 309. The memory card 309 may be inserted into the card reader 301 through memory card slot 307. In some embodiments, the data from the memory card 309 may be used by a CPU 203. In some embodiments, the memory card 309 may be a SmartMedia™ (SM) memory card, xD Picture Cards™ (xD), a Memory Stick™, a High Speed Memory Stick (HSMS), a Memory Stick PRO™ (MSPRO), a Secure Digital (SD) memory card, a MultiMediaMemory™ memory card (MMC), NAND Flash, Compact Flash™ (CF) or a CF form-factor Advanced Technology Attachment (ATA) hard drive. In various embodiments, a cable from an upstream port 305 may carry a power line 321, ground 324, and a pair of data lines 322, 323 (D+ and D−) to transfer data between the card reader 301 and the computer. In some embodiments, the D+ and D− lines (322,323) may interact with the physical interface 303 through an attachment indicator mechanism 302.

Figure 4A:
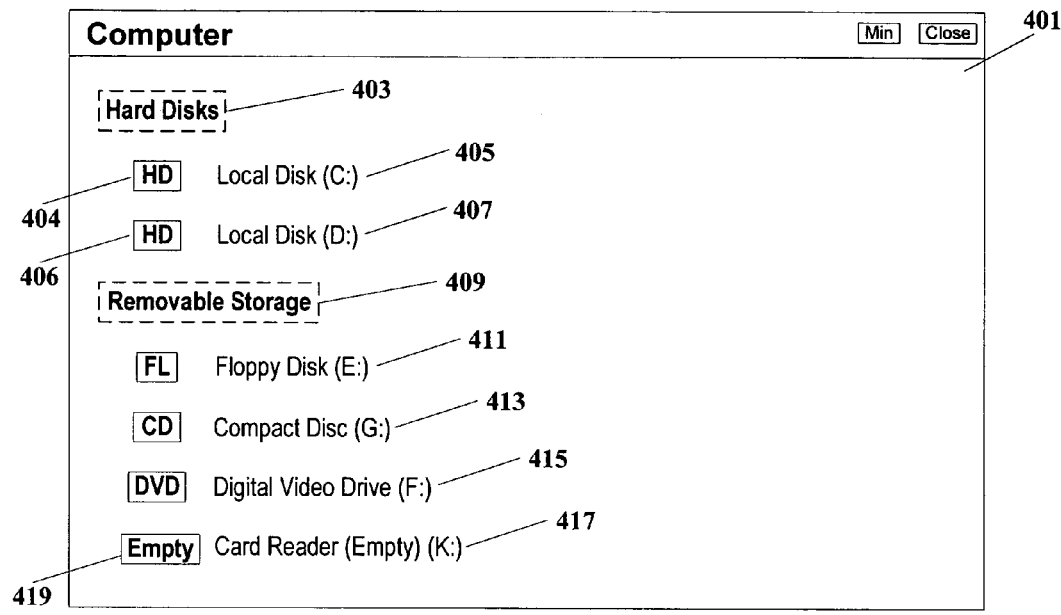
FIGS. 4a, 4b, 4c, and 4d illustrate embodiments of icons displayed specific to a type of memory card in a card reader.

FIGS. 4a, 4b, 4c, and 4d illustrate embodiments of icons displayed specific to types of memory cards in a card reader. FIG. 4a illustrates an embodiment of a menu screen 401 showing available memory mediums for a computer. In some embodiments, a menu screen 401 may have sections to display types of hard disks 403 and types of removable storage 409. In some embodiments, the hard disk section 403 may include a C drive 405 and a D drive 407. In one embodiment, the C drive and D drive may have similar icons 404 and 406 because each is a hard drive accessible by the computer. In some embodiments, the C drive and D drive may have different icons. Removable storage icons (e.g., floppy disk 411, Compact Disc (CD) drive 413, Digital Versatile Disc (DVD) drive 415, and card reader 417) may be displayed in the removable storage section 409. In some embodiments, an icon and text may not be displayed for a card reader if the card reader does not have a card. In some embodiments, an icon 419 may indicate that the card reader is empty. In addition, text 417 next to the empty card reader icon 419 may also indicate that the card reader is empty (e.g., by displaying "(empty)").

Figure 4B:
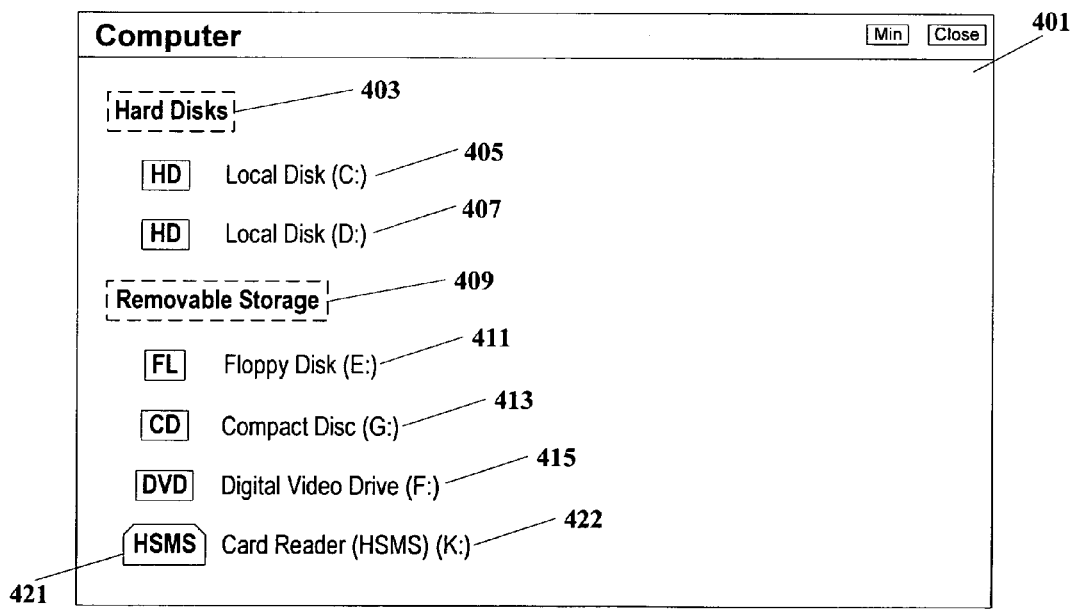

As seen in FIG. 4b, if an HSMS™ memory card is inserted into the card reader, an HSMS™ icon 421 may be displayed. In some embodiments, text 422 may be displayed proximate to the icon 421 to indicate the type of memory card. For example, text 422 may read "HSMS™". Different icons and different text are also contemplated. In addition, other menu screen styles may be used. Furthermore, icons and text for the memory cards may be used in other locations on the computer. For example, icons and text specific to the type of memory card in the card reader may be displayed in application specific save screens.

Figure 4C:
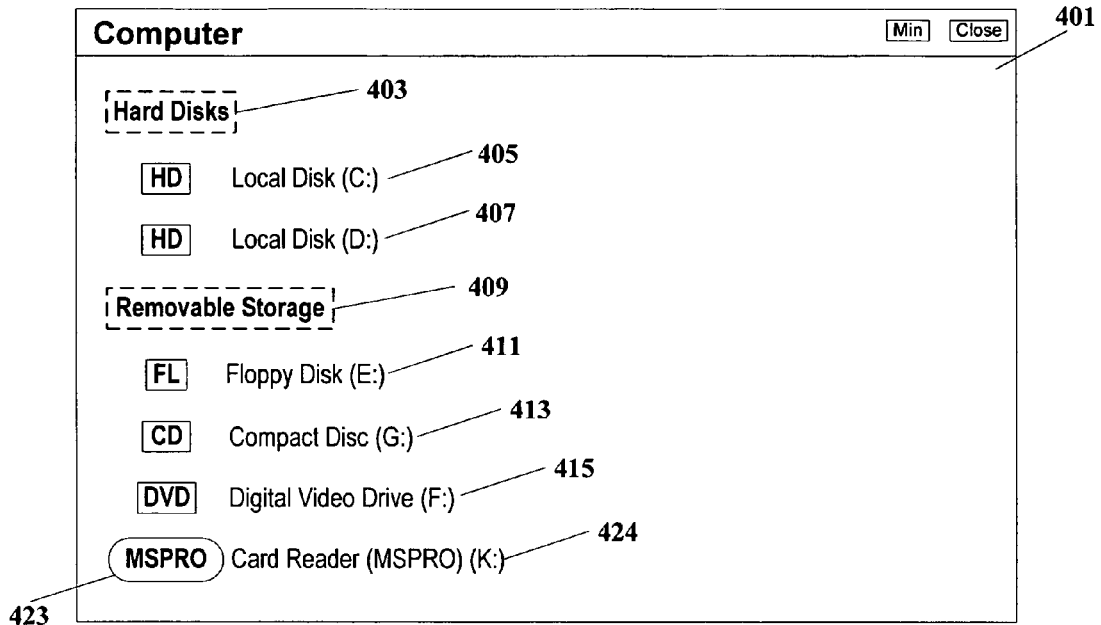
Figure 4D:
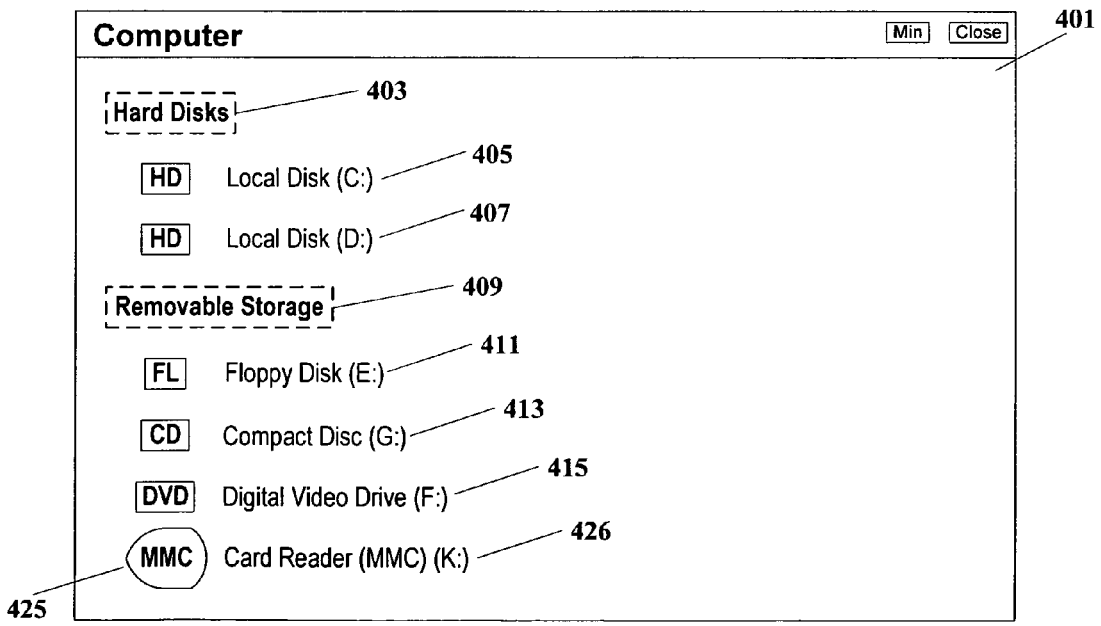

As seen in FIG. 4c, if an MSPRO™ memory card is inserted, an icon 423 specific to the MSPRO™ may be displayed. Text 424 may also be displayed to further indicate the type of memory card. As seen in FIG. 4d, text 426 may be displayed below the icon 425 to indicate the type of memory card in the card reader (e.g., "MMC™"). In various embodiments, the text 426 may be displayed in other locations. For example, the text may be displayed above or to the left of the icon 425.

Figure 5:
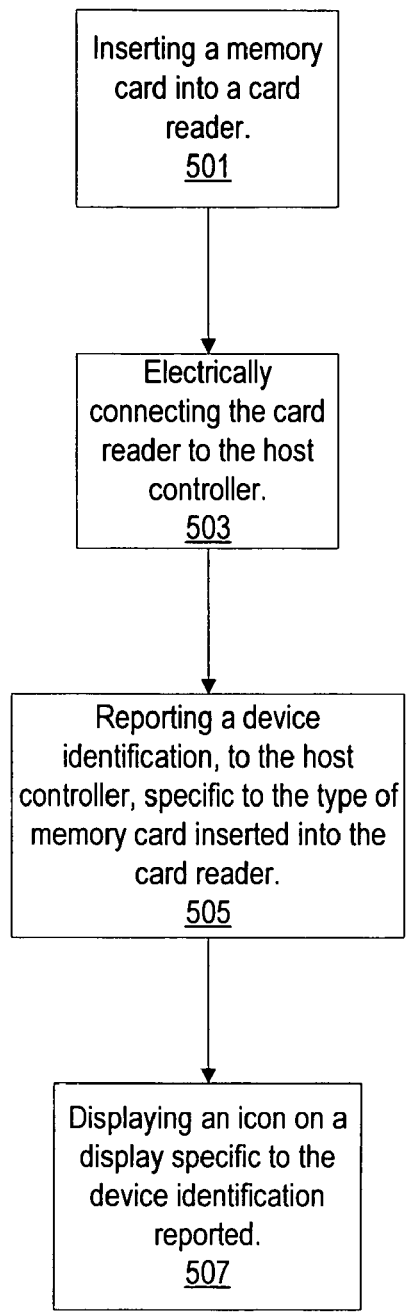
FIG. 5 is a flowchart of a method for displaying an icon specific to a memory card inserted into a card reader, according to an embodiment.

FIG. 5 is a flowchart of an embodiment for displaying an icon specific to a memory card inserted into a card reader. It should be noted that in various embodiments of the methods described below, one or more of the steps described may be performed concurrently, in a different order than shown, or may be omitted entirely. Other additional steps may also be performed as desired.

At 501, a memory card may be inserted into a card reader. For example, the memory card may be inserted into a multi-format flash memory card reader. The card reader may be coupled to a computer to transfer data between the memory card and the computer.

At 503, the card reader may be electrically connected to the host controller. When the card is inserted into the card reader, the card reader may pull the D+ line 322 high to approximately 3.3 volts using a pull up resistor on the D+ line. The host controller may then detect the presence of the card reader on the bus and reset the card reader. For high speed devices, during reset, the device, such as a high speed card reader, "chirps" by driving the D− line. The host controller responds by alternately driving the D+ and D− lines. When the high speed device detects the alternating chirps, the high speed device electrically removes the pull up resistor to balance the line and then continues communicating at high speed.

At 505, a device identification may be reported to the host controller (e.g., a USB Product ID). In some embodiments, each time a card is inserted or removed, the card reader may be electrically connected/disconnected, because when the card reader connects, the card reader may send a vender identification (VID) and a product identification (PID) to the host controller that identifies a type of memory card inserted. The VID/PID device identification may be specific to the type of memory card inserted into the card reader. Different device identifications may be reported to the host controller as if the card reader were actually several different card readers each dedicated to a different memory card type. In some embodiments, a registry on the computer may be preloaded with the different VID/PID identifications and there respective icons. In some embodiments, the VID/PID may be sent without electrically disconnecting/reconnecting the card reader. For example, when a card is inserted into the card reader, a new VID/PID (or some other identifying information) may be sent from the card reader without having to reconnect the card reader.

At 507, an icon may be displayed on a display coupled to the computer. In some embodiments, text may also be displayed, relative to the icon, to further identify the type of memory card inserted. For example, a type (or acronym for the type) of memory card may be displayed next to the memory card icon.

Figure 6:
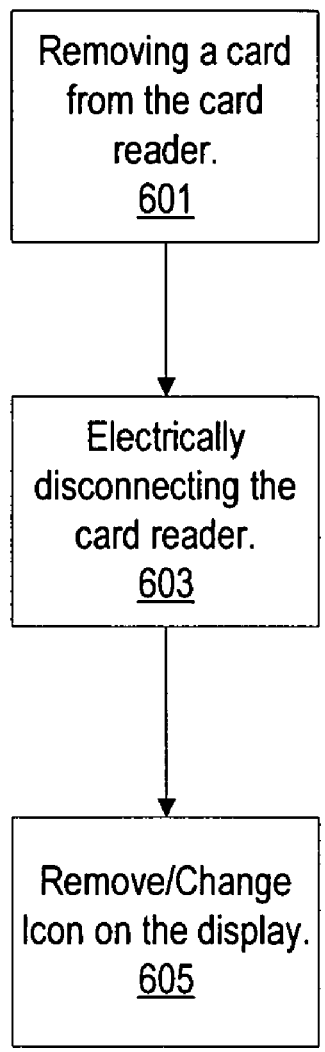
FIG. 6 is a flowchart of a method for removing an icon from a display and electrically disconnecting a card reader, according to an embodiment.

FIG. 6 is a flowchart of an embodiment for removing an icon from a display and electrically disconnecting a card reader when a memory card is removed from the card reader. It should be noted that in various embodiments of the methods described below, one or more of the steps described may be performed concurrently, in a different order than shown, or may be omitted entirely. Other additional steps may also be performed as desired.

At 601, a memory card may be removed from a card reader. In some embodiments, a user may pull the memory card out of a memory card slot of the card reader.

At 603, the card reader may optionally be electrically disconnected from a host controller. For full speed devices, the pull up resistor is electrically removed (i.e., set to a high impedance or "tri-stated") from the D+ line. The host controller may interpret this as a disconnect. For high speed devices, the D+ and D− lines may be set to a high impedance (i.e., tri-stated). In some embodiments, electrically disconnecting the card reader may also serve to reduce power consumption caused by the card reader. In another embodiment, the card reader may generally remain electrically connected to the USB host controller, and step 603 may not be performed.

At 605, an icon, specific to the type of memory card, may be removed from a display. In some embodiments, the empty card reader icon may be displayed after the icon specific to the type of memory card is removed. In some embodiments, an empty card reader icon may not be displayed.

As used herein, a memory medium may include any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network. In addition, as used herein, a carrier medium—a memory medium as described above, as well as signals such as electrical, electromagnetic, or digital signals, conveyed via a communication medium such as a bus, network and/or a wireless link. The computer system 101 may include a memory medium(s) on which one or more computer programs or software components according to one embodiment of the present invention may be stored. For example, the memory medium may comprise a read only memory or programmable read only memory such as an EEPROM or flash memory that stores a software program (e.g., firmware) that is executable to perform the methods described herein. Various embodiments further include receiving or storing instructions and/or data implemented in accordance with the foregoing description upon a carrier medium.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following requests.

I claim:

1. A system, comprising:
a processor;
a display coupled to the processor;
a host controller coupled to the processor; and
a card reader coupled to the host controller;
wherein the card reader is operable to report an interface of a memory card inserted into the card reader; and
wherein the display is operable to display an icon specific to the interface of the memory card inserted into the card reader, wherein the icon is selected from a plurality of possible icons, and wherein each of the plurality of possible icons is specific to a respective one of a plurality of different memory card interfaces.

2. The system of claim 1, wherein the card reader is electrically connected to the host controller when the memory card is inserted into the card reader.

3. The system of claim 1, wherein the card reader is electrically disconnected from the host controller when the memory card is removed from the card reader.

4. The system of claim 1, wherein the card reader reports a device identification specific to the interface of the memory card inserted into the card reader.

5. The system of claim 4, further comprising a registry preloaded with an icon specific to the device identification reported.

6. The system of claim 4, wherein the card reader is operable to report at least two different device identifications specific to at least two different interfaces of memory cards.

7. The system of claim 1, wherein the interface of the memory card comprises one of a SmartMedia™ (SM) memory card interface, xD Picture Cards™ (xD) interface, a Memory Stick™ interface, a High Speed Memory Stick (HSMS) interface, a Memory Stick PRO™ (MSPRO) interface, a Secure Digital (SD) memory card interface, a MultiMediaMemory™ memory card (MMC) interface, NAND Flash interface, Compact Flash™ (CF) interface, or a CF form-factor Advanced Technology Attachment (ATA) hard drive interface.

8. The system of claim 1, wherein text indicative of the interface of the memory card is displayed proximate to the icon.

9. The system of claim 1, wherein the card reader is a single slot card reader.

10. The system of claim 1, wherein the interface of the memory card comprises one of a SmartMedia™ (SM) memory card interface, xD Picture Cards™ (xD) interface, a Memory Stick™ interface, a High Speed Memory Stick (HSMS) interface, a Memory Stick PRO™ (MSPRO) interface, a Secure Digital (SD) memory card interface, a MultiMediaMemory™ memory card (MMC) interface, NAND Flash interface, Compact Flash™ (CF) interface, or a CF form-factor Advanced Technology Attachment (ATA) hard drive interface.

11. A method, comprising:
electrically connecting a card reader to a host controller when a memory card is inserted into the card reader;
reporting a device identification, to the host controller, specific to an interface of the memory card inserted into the card reader, wherein the device identification is selected from a plurality of device identifications, and wherein each of the plurality of device identifications is specific to a respective one of a plurality of different memory card interfaces; and
displaying an icon on a display coupled to the host controller, wherein the icon is specific to the device identification reported.

12. The method of claim 11, further comprising electrically disconnecting the card reader if the memory card is removed.

13. The method of claim 12, further comprising removing an icon from the display when the card reader is electrically disconnected.

14. The method of claim 12, further comprising displaying an empty card reader icon on the display.

15. The method of claim 11, further comprising receiving an icon indication for display from a registry coupled to the processor.

16. The method of claim 15, wherein the registry has at least two icon types preloaded, wherein each of the at least two icons is specific to a different interface of the memory card.

17. The method of claim 11, wherein the card reader is a single slot card reader.

18. The method of claim 11, wherein the icon is displayed in a menu of available storage media accessible by the processor.

19. The method of claim 11, further comprising displaying text indicative of the interface of the memory card relative to the icon.

20. The method of claim 11, further comprising reporting a the device identification when the memory card is inserted into the card reader without having to reconnect the card reader.

21. A computer-accessible memory medium comprising program instructions, wherein the program instructions are executable by a processor to:
electrically connect a card reader to a host controller when a memory card is inserted into the card reader, wherein the memory card has a format;
receive a device identification of a plurality of device identifications, from the host controller, specific to the format of the memory card inserted into the card reader, wherein each of the plurality of device identifications is specific to a respective one of a plurality of different memory card formats; and
display an icon on a display, wherein the icon is specific to the device identification reported.

22. The computer-accessible memory medium of claim 21, wherein the program instructions are further executable to electrically disconnect the card reader if the memory card is removed.

23. The computer-accessible memory medium of claim 22, wherein the program instructions are further executable to receive an icon indication for display from a registry of an operating system for a processor coupled to the host controller.

24. The computer-accessible memory medium of claim 22, wherein the registry has at least two icon types preloaded, wherein each of the at least two icons is specific to a different format of the memory card.

25. The computer-accessible memory medium of claim 22, wherein the icon is displayed in a menu of available storage media accessible by the processor.

26. The computer-accessible memory medium of claim 22, wherein the program instructions are further executable to report a the device identification when the memory card is inserted into the card reader without having to reconnect the card reader.

* * * * *

UNITED STATES PATENT AND TRADEMARK OFFICE
CERTIFICATE OF CORRECTION

| | | |
|---|---|---|
| PATENT NO. | : 7,131,595 B2 | |
| APPLICATION NO. | : 10/762679 | |
| DATED | : November 7, 2006 | |
| INVENTOR(S) | : Henry Wurzburg | |

It is certified that error appears in the above-identified patent and that said Letters Patent is hereby corrected as shown below:

In the Claims:

Column 7 Lines 61 - 62, please delete "proximate to the. icon." and substitute -- proximate to the icon. --;

Column 8 Line 45, please delete "a the device identification" and substitute -- the device identification --;

Column 9 Lines 1 - 2, please delete "memory medium of claim 22, wherein" and substitute -- memory medium of claim 21, wherein --;
  Column 9 Lines 6 - 7, please delete "memory medium of claim 22, wherein" and substitute -- memory medium of claim 21, wherein --;
  Column 10 Lines 1 - 2, please delete "memory medium of claim 22, wherein" and substitute -- memory medium of claim 21, wherein --;
  Column 10 Lines 4 - 5, please delete "memory medium of claim 22, wherein" and substitute -- memory medium of claim 21, wherein --;
  Column 10 Line 6, please delete "to report a the device" and substitute -- to report the device --.

Signed and Sealed this

Sixteenth Day of January, 2007

JON W. DUDAS
*Director of the United States Patent and Trademark Office*